United States Patent
Machida et al.

(10) Patent No.: US 6,803,957 B1
(45) Date of Patent: Oct. 12, 2004

(54) IMAGE SENSOR

(75) Inventors: Satoshi Machida, Chiba (JP); Masahiro Yokomichi, Chiba (JP); Yukito Kawahara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/237,230

(22) Filed: Jan. 26, 1999

(30) Foreign Application Priority Data

Feb. 2, 1998 (JP) ............................................. 10-21203

(51) Int. Cl.[7] .............................................. H04N 5/335
(52) U.S. Cl. ....................... 348/308; 348/302; 358/482; 358/513
(58) Field of Search ................................ 348/302, 308; 358/482, 513

(56) References Cited

U.S. PATENT DOCUMENTS

| | | | | |
|---|---|---|---|---|
| 4,775,895 A | * | 10/1988 | Traupe et al. ................. | 348/241 |
| 5,153,731 A | * | 10/1992 | Nagasaki et al. ............ | 257/231 |
| 5,382,975 A | * | 1/1995 | Sakai et al. .................. | 348/241 |
| 5,479,208 A | * | 12/1995 | Okumura ................. | 250/214 A |
| 5,784,178 A | * | 7/1998 | Tsai et al. ................. | 250/208.1 |
| 5,856,686 A | * | 1/1999 | Watanabe et al. ........... | 257/291 |
| 5,892,540 A | * | 4/1999 | Kozlowski et al. ....... | 250/208.1 |
| 6,133,862 A | * | 10/2000 | Dhuse et al. ............... | 341/118 |
| 6,166,767 A | * | 12/2000 | Watanabe .................... | 348/301 |
| 6,243,134 B1 | * | 6/2001 | Beiley ......................... | 348/308 |
| 6,248,991 B1 | * | 6/2001 | Chen et al. .............. | 250/208.1 |
| 6,291,810 B1 | * | 9/2001 | Yokomichi et al. ....... | 250/208.1 |
| 6,344,877 B1 | * | 2/2002 | Gowda et al. .............. | 348/245 |
| 6,429,413 B1 | * | 8/2002 | Kawahara et al. ........ | 250/208.1 |
| 6,456,326 B2 | * | 9/2002 | Fossum et al. ............. | 348/308 |
| 6,459,078 B1 | * | 10/2002 | Fowler .................... | 250/214 A |
| 2002/0085106 A1 | * | 7/2002 | Beiley et al. ................ | 348/296 |

* cited by examiner

Primary Examiner—Andrew Christensen
Assistant Examiner—Dorothy Wu
(74) Attorney, Agent, or Firm—Adams & Wilks

(57) ABSTRACT

To eliminate after-image due to residual charges to provide an output form that is easy to obtain effective on-light output. The outputs of photo-diodes 1 are read out as sequential signal outputs on a common signal line 15 through connected amplifiers 3, and two states of before and after resetting the photo-diodes 1 are outputted in order for each light receiving element.

8 Claims, 11 Drawing Sheets

IMAGE SENSOR

BACKGROUND OF THE INVENTION

The present invention relates to a one-dimensional image sensor for converting reflection light received from an original document irradiated by light into an electrical signal, which is applied to image reading devices such as FAXs.

There is shown in FIG. 11 a circuit diagram of a contact type one-dimensional image sensor used for conventional FAX reading devices. As shown in FIG. 11, it is the type of device in which outputs of a photo-transistor PTR are input to switches S1 to Sn to turn on in order, and read out on a common signal line 15.

The contact type photo-transistor one-dimensional image sensor as above is described in Japanese Patent Laying-open No. S61-124171.

However, in the one-dimensional image sensor as this there has been a problem that, because remaining carriers on a base of a photo-transistor PTR are removed through an emitter, the base potential cannot be reset to an initial state resulting in significant after-image.

Also, in order to obtain effective on-light outputs, before reading an original, the light source is turned OFF into a dark state to read out an off-light output and record its value, and thereafter the light source is brought into an ON state and light is irradiated onto the original and an on-light output is read out so that a difference from the formerly recorded off-light output is determined to thereby obtain an effective on-light output. However, this method has to have a memory to record the off-light output thus raising a problem of increased cost. Also, there are often cases that the aforesaid off-light output is not repeatedly set but is incorporated in the final product such as facsimiles wherein it is set only once at a shipping stage from the shop. When the off-light output has a temperature characteristic, there is a difference between the off-light output recorded at the shop before shipping and the off-light output upon actually reading the original, leading to a problem that an effective on-light output is not correctly determined with degradation in reproduced images.

Therefore, in order to solve such a conventional problem, it is an object of the present invention to supply with low cost an image sensor with reduced after-image and to determine an effective on-light output with accuracy.

SUMMARY OF THE INVENTION

In order to solve the above problem, the present invention structured an image sensor as follows.

(1) In an image sensor structured by a plurality of linear image sensor ICs in a straight line form, the image sensor ICs are structured such that the outputs of a plurality of photo-diodes are read out as sequential signal outputs through amplifiers connected to each photo-diode through a common signal line.

(2) The image sensor ICs are structured such that the output of each photo-diode includes two states of before reset operation of each photo-diode and upon resetting of the photo-diodes.

(3) The image sensor ICs are structured such that the output of each photo-diode includes three states of before reset operation of each photo-diode, upon resetting of the photo-diodes, and after resetting of the photo-diodes.

(4) The image sensor ICs are structured such that a reset switch is provided to temporarily bring the common signal line close to an initial state potential.

EMBODIMENT OF THE INVENTION

The present invention uses photo-diodes for light receiving elements for a unit block and connects amplifiers to the photo-diodes within the block so that terminal voltages of the photo-diodes varying depending upon a light reception amount are outputted through the amplifiers, and wherein a MOS switch for resetting the photo-diodes to an initial state is provided in the unit block and terminal voltages before and after resetting the light receiving elements of a plurality of blocks are outputted in order through respective amplifiers.

The present invention will be explained hereinbelow using the drawings.

Figure 1:
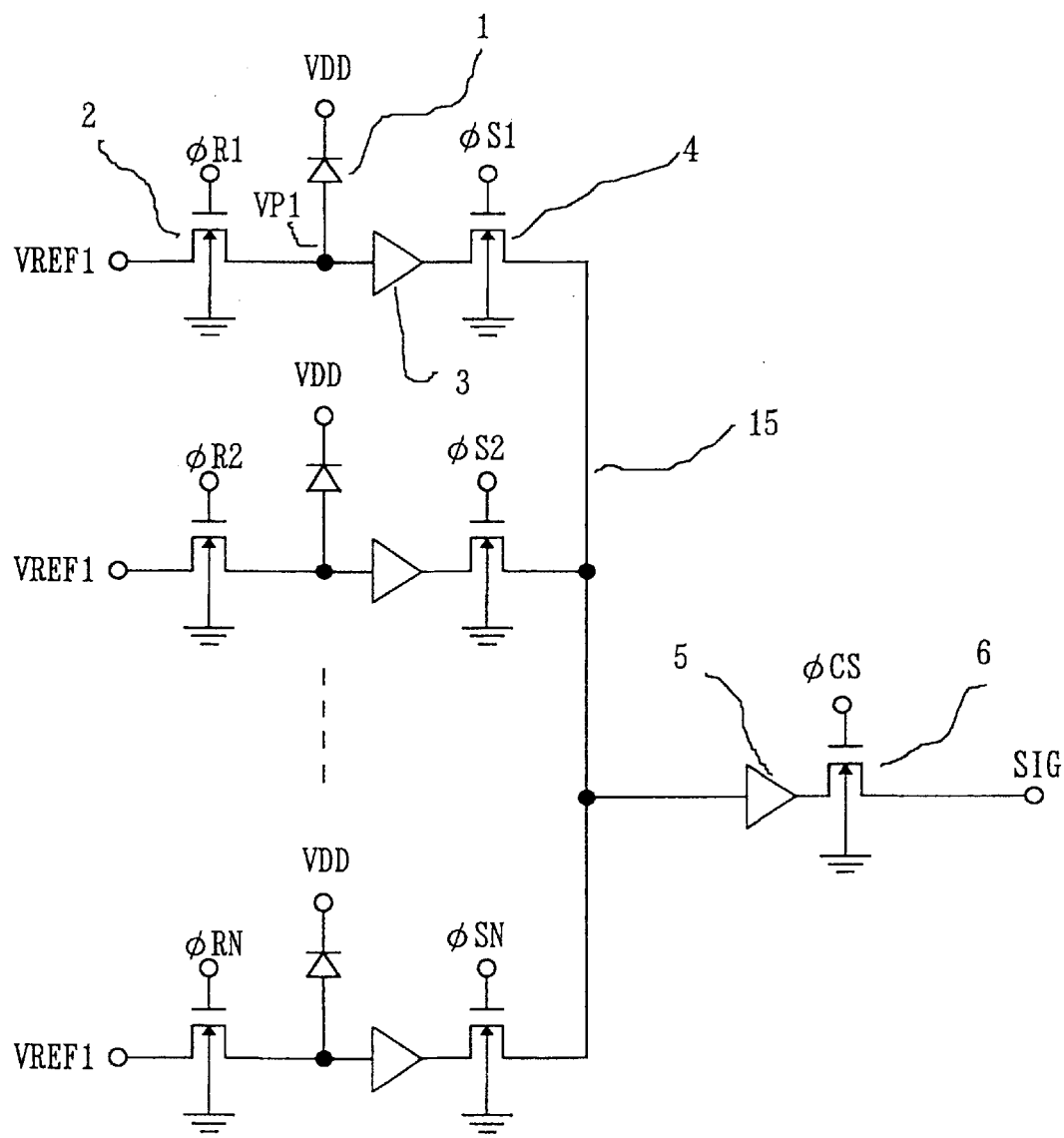
FIG. 1 is a circuit diagram of a first embodiment of a linear image sensor IC constituting an image sensor of the present invention.

FIG. 1 is a circuit diagram of an image sensor of the present invention.

Incidentally, a unit light receiving circuit is configured as follows. A photo-diode 1 as a light receiving element has an N region of a first electrode connected to power supply potential VDD, while a P region of a second electrode of the photo-diode 1 is connected to a drain of a first electrode of a MOS transistor 2 serving as a reset switch to bring back the photo-diode to an initial state, and to an input terminal of an amplifier 3 for amplifying a signal of the photo-diode. The MOS transistor 2, as the reset switch for bringing back the photo-diode to the initial state, has a source of a second electrode which is supplied with a reference voltage VREF1 that is a initial potential of the photo-diode. The amplifier 3 has an output connected to a common signal line 15 through a MOS transistor as a read-out switch.

There are included a plurality of blocks configured the same as the above unit light receiving circuit block in a number at least equal to the number of output bits. Here, explanation will be made as N bits, for convenience.

The common signal line 15 is input to a second amplifier 5 which further amplifies a signal output to the common signal line 15. The output of the amplifier 5 is connected through a MOS transistor 6 serving as a chip select switch for selectively shorting a second amplifier to an image sensor signal output terminal SIG for outputting an image sensor output signal VSIG.

Figure 2:
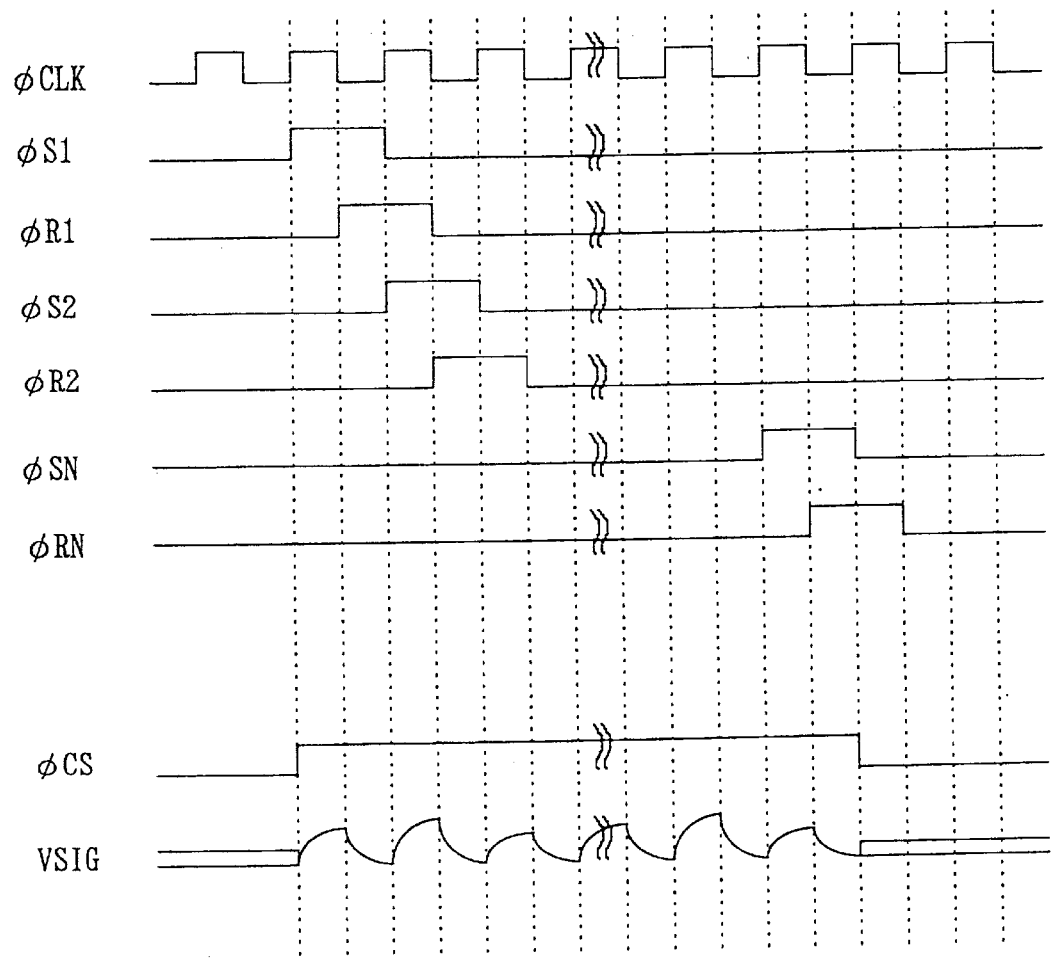
FIG. 2 is a timing chart of the first embodiment of the linear image sensor IC constituting the image sensor of the present invention.

FIG. 2 is a timing chart of the image sensor shown in FIG. 1.

Although not described in FIG. 1, in synchronism with a clock φCLK, pulses φS1-φSN are inputted in the order to a gate of the MOS transistor 4 of each bit, and an output of the photo-diode 1 of each bit is read out on the common signal line 15. The gate of the MOS transistor 2 on a first bit is turned on by a pulse φR1 with a delay of a half clock from φS1, and the P region of the photo-diode 1 is reset to a potential of VREF1. Similarly, the P regions for the photo-diodes 1 on the second bit and the later are reset to the potential of VREF1 in the order. When φR1 becomes low, the MOS transistor 2 is turned off so that the P region of the photo-diode becomes floating. The potential at the P region of the photo-diode 1 immediately after the turning off of the MOS transistor 2 becomes slightly lower than the reference voltage VREF1. This is due to switching noises upon turning off of the gate of the MOS transistor 2. However, because the potential difference is slight, the potential upon resetting the P region of the photo-diode 1 to the potential of VREF1 can be considered that the output value upon externally reading out through the amplifier 3 and the amplifier 5 be almost the same as an off-light output.

After the gate of the MOS transistor 2 is turned off, if light comes to the photo-diode 1, an electrical current flows from the P type region to the N type region of the photo-diode 1 due to generated carriers, and the potential at the P region of the photo-diode 1 gradually increases. If the MOS transistor 4 is turned on during the next read out, the potential on the common signal line 15 approaches the output voltage of the amplifier 3 commensurate with a potential VP1 at the P region of the photo-diode 1 at this time. Further, the output of the amplifier 5 is externally read out as an on-light output through the amplifier 5. Because this is followed by the operation of resetting the P region of the photo-diode 1 to the potential of VREF1, the image sensor signal output terminal SIG has on-light outputs and off-light outputs of each bit are externally read out sequentially in synchronism with a clock.

Incidentally, in order to provide such an operation, the MOS transistor 6 is inputted with a pulse φCS that assumes a high state from the timing the pulse φS1 becomes high to that a final bit off-light output has been read out. The output of the common signal line 15 is read out on the image sensor signal output terminal SIG.

In this manner, by using the photo-diode as a light receiving element by externally reading, through the amplifier, the potential on the second electrode on the side the potential varies depending upon the amount of light reception, there is less susceptibility to the effects of switching noises caused by the operations of the read-out switch and the chip select switch as well as noises caused by the line-to-line capacitance. Also, after reading the signal, on the second electrode on the side the potential varies depending on the light receiving amount by the use of the photo-diode for a light receiving element, an initial potential is supplied through a reset switch to bring the photo-diode back to an initial state, whereby the deterioration of images such as after-image due to residual carriers as found in the image sensor having a conventional photo-transistor as a light receiving element was greatly improved, thus obtaining good image quality.

In the operation as shown in the timing chart of FIG. 2, the gate of the first-bit MOS transistor 2 is turned on by the pulse φR1 with a delay of a half clock from the pulse φS1 as stated before to thereby reset the P region of the photo-diode 1 to the potential VREF1. A slight potential difference due to the switching of the MOS transistor 2 occurs as in FIG. 3 between the potential at the P region of the photo-diode 1 at this time and the potential at the P region of the photo-diode 1 in floating due to low of φR1 and turning off of the MOS transistor 2. In order to further improve the image quality without neglecting this, operation is made as shown by a timing chart in FIG. 4.

Figure 3:
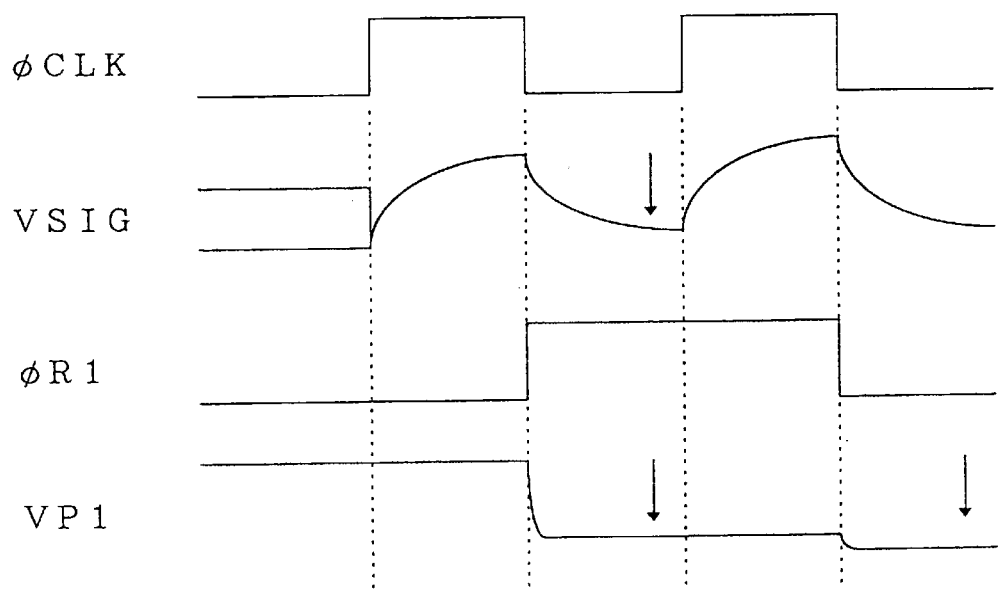
FIG. 3 is a timing chart showing the potential of a photo-diode of the first embodiment of the linear image sensor IC constituting the image sensor of the present invention.
Figure 4:
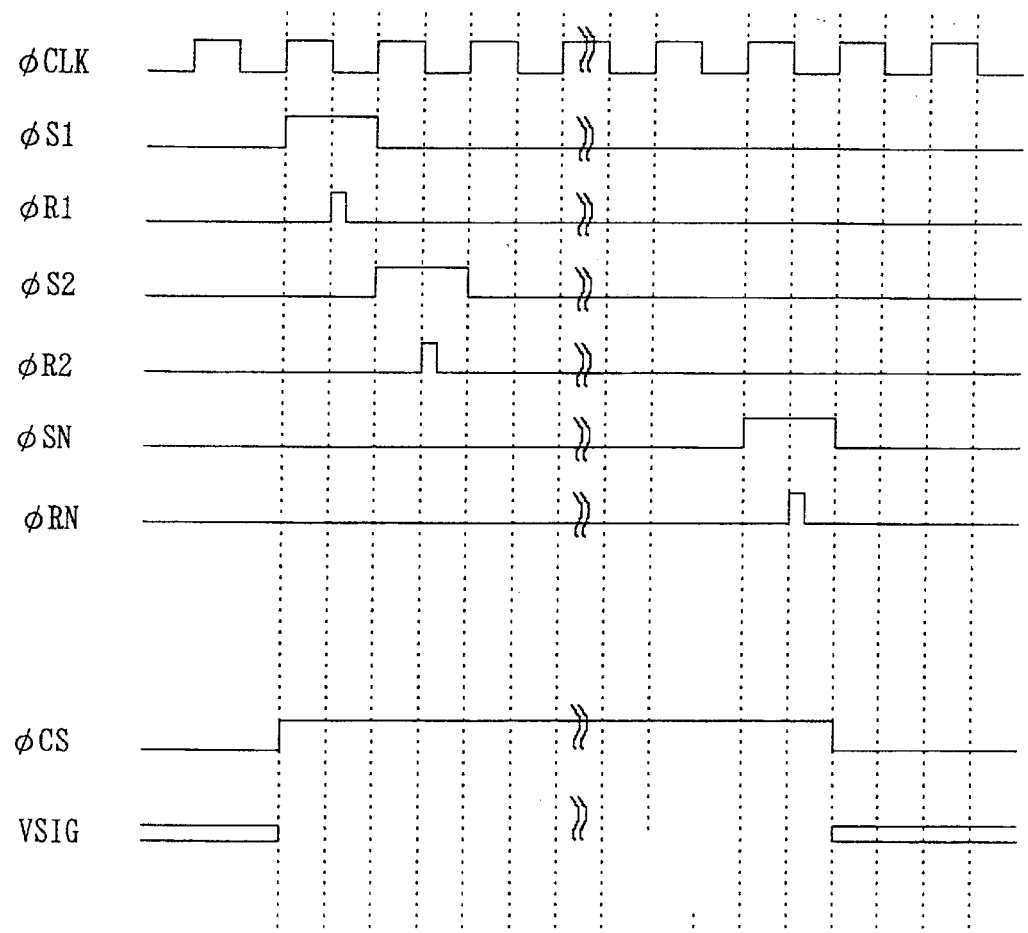
FIG. 4 is another timing chart of the first embodiment of the linear image sensor IC constituting the image sensor of the present invention.
Figure 5:
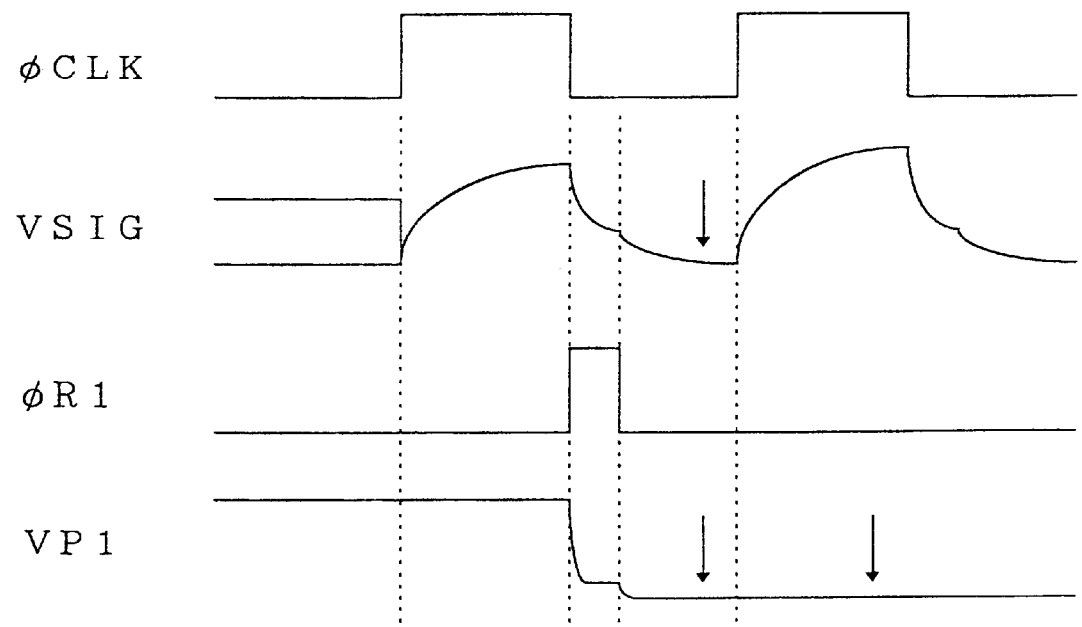
FIG. 5 is another timing chart showing the potential of the photo-diode of the first embodiment of the linear image sensor IC constituting the image sensor of the present invention.

FIG. 4 is also a timing chart showing different operations from FIG. 2 and FIG. 3 of the present invention. The different point from FIG. 2 lies in that the pulses φR1–φRN are reduced in pulse width to an extent that the photo-diode can be reset and the output of each bit includes an on-light output, an initial potential output in a state of resetting, and an potential output in a state after resetting. That is, in the case of for example output of the first bit, an on-light output commensurate with the exposure amount of first irradiation is outputted during a clock low time period and thereafter the photo-diode is instantaneously reset at timing the clock becomes from low to high, and thereafter the potential of a state after resetting is outputted during a remaining high time period of the clock. Unless light is irradiated, a leak current is less at the junction. Accordingly, this potential is maintained which is outputted as an off-light output voltage if the next pulse φS1 becomes high. Because outputting as it is the potential VP1 at the P region of the photo-diode 1 after turning the MOS transistor 2 from on to off, a slight potential difference does not occur as shown in FIG. 5 due to switching as encountered in FIG. 3.

Figure 6:
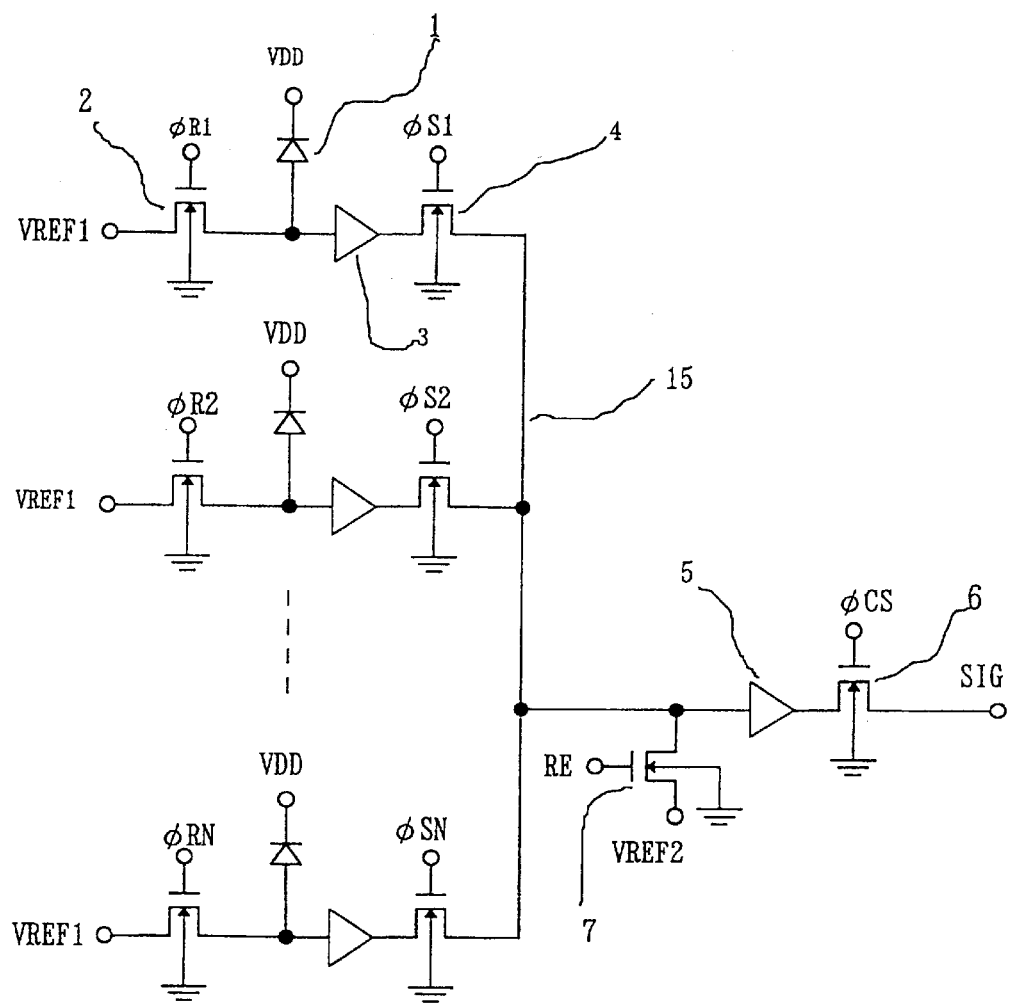
FIG. 6 is a circuit diagram of a second embodiment of a linear image sensor IC constituting the image sensor of the present invention.

Nextly a second embodiment of a linear image sensor IC shown in FIG. 6 of the present invention is shown. In the present invention, because the variation in potential of the photo-diode dependent upon the light receiving amount is externally outputted through the amplifier, the operation speed is realized high by the amplifier performance. The structure is that the interconnection capacitance increases to limit the reading speeds compared with the generally-known CCD image sensor because of the provision of the common signal line in the linear image sensor IC as shown in FIG. 2. In order to further increase the reading speed, the common signal line 15 is made as an image sensor IC that is provided with the second resetting switch MOS transistor 7 to temporarily bring close to the initial state potential, as shown in FIG. 6.

Figure 7:
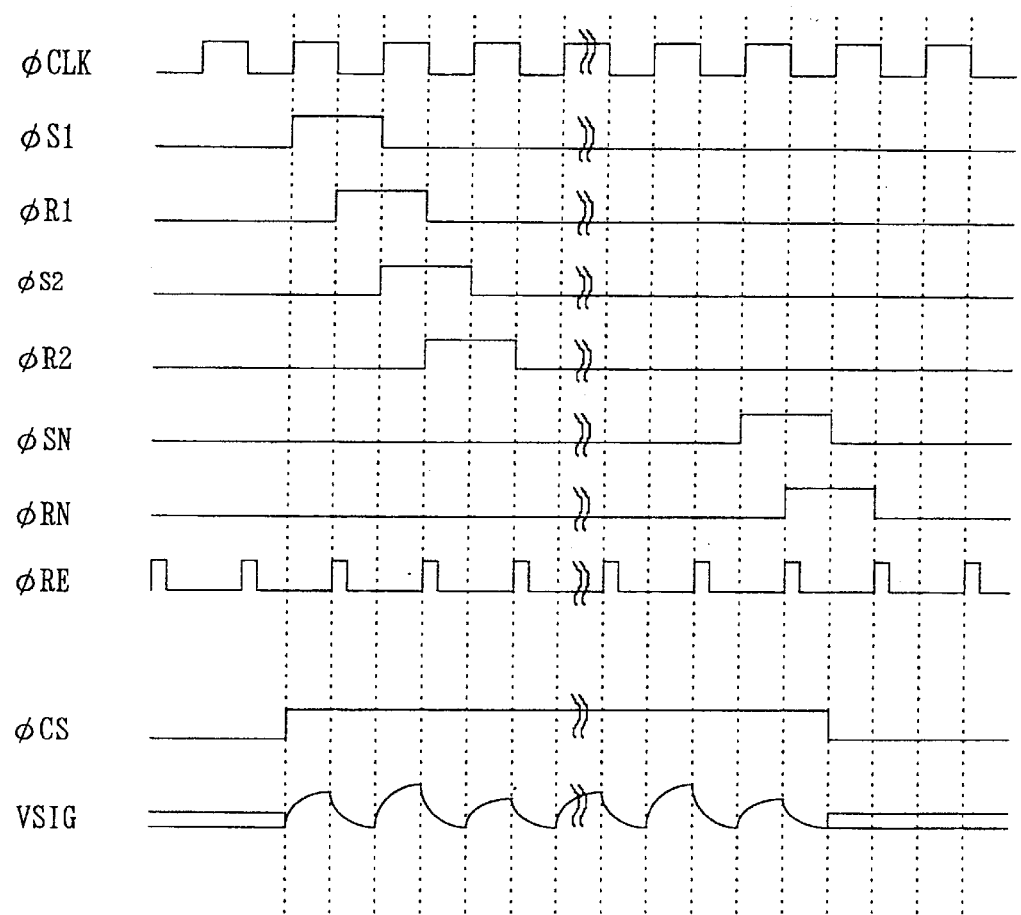
FIG. 7 is a timing chart of the second embodiment of the linear image sensor IC constituting the image sensor of the present invention.

The drain as a first electrode of the second resetting switch MOS transistor 7 is connected to the common signal line and the source as a second electrode of the MOS transistor 7 is connected to the second reference potential VREF2. This potential VREF2 may be the reference potential VREF1 for resetting the photo-diode to the initial state or may be a lower potential than that. When the initial potential upon resetting each unit light receiving circuit is outputted through the common signal line, the MOS transistor 7 of the second resetting switch is temporarily put in conduction by being synchronized with a high state of a pulse RE to give operation on a timing chart as shown in FIG. 7 in a manner promptly bringing the common signal line close to the initial potential. With such a circuit configuration, the initial potential can be stably outputted even during high speed operation, suppressing the deterioration in image quality.

Figure 8:
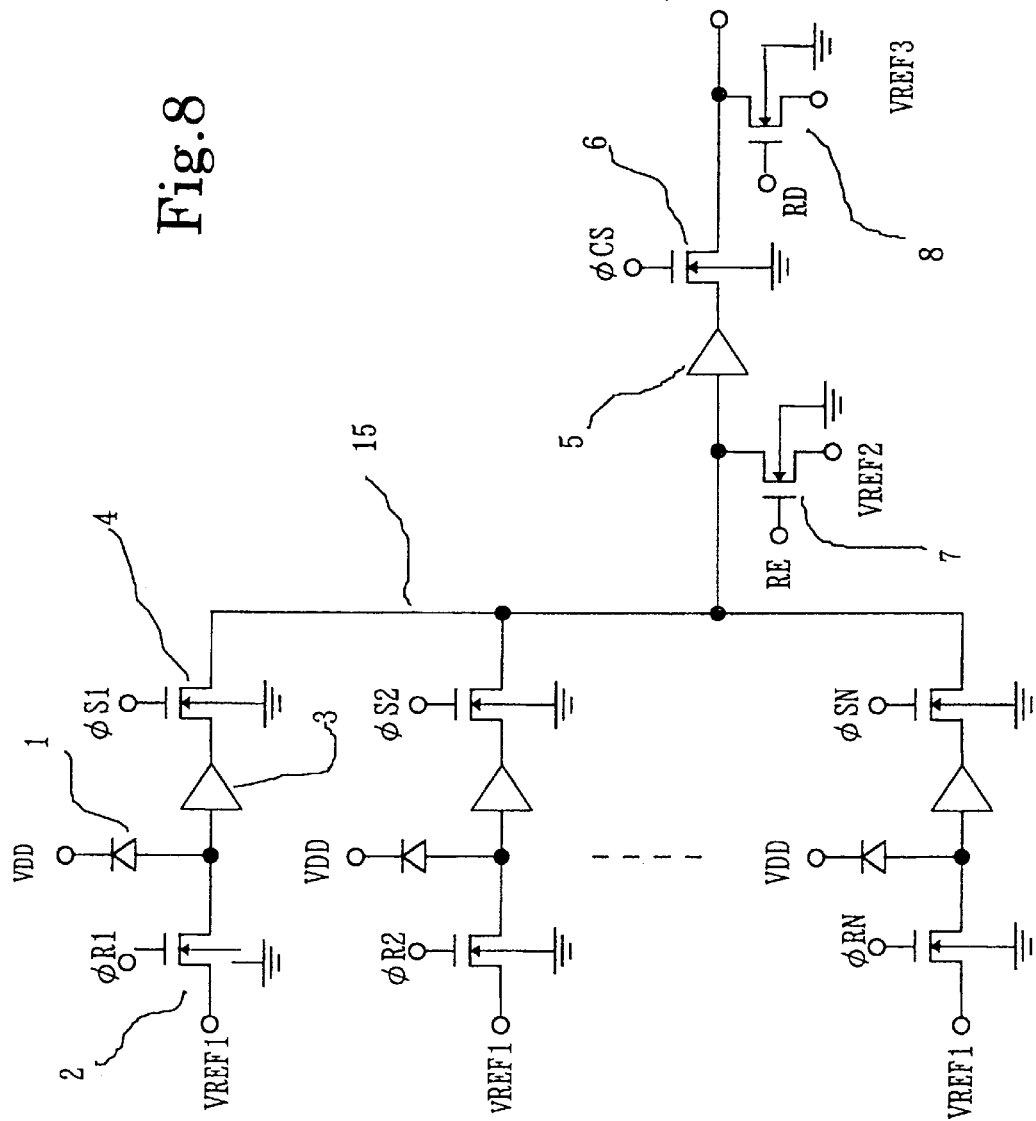
FIG. 8 is a circuit diagram of a third embodiment of a linear image sensor IC constituting the image sensor of the present invention.
Figure 9:
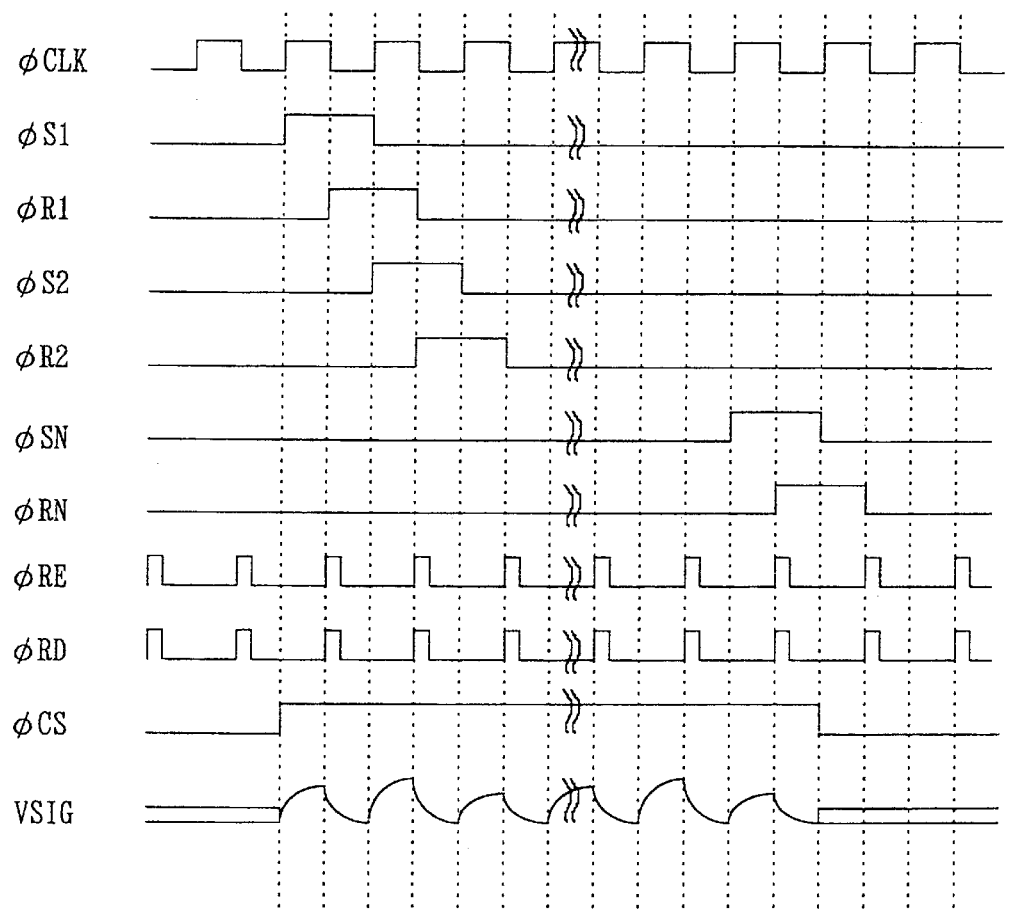
FIG. 9 is a timing chart of the third embodiment of the linear image sensor IC constituting the image sensor of the present invention.

Nextly explanations will be made on a third embodiment of a linear image sensor IC shown in FIG. 8 of the present invention. In order to obtain a similar effect against increase in the external load capacitance occurring upon connecting several linear image sensor ICs, a MOS transistor 8 as a third reset switch as shown in FIG. 8 is newly added. If operated on a timing chart as shown in FIG. 9, high speed operation can be achieved. Although for convenience the pulse φRE and the pulse φRD for operating these reset switches are shortened, it is possible to extend to a clock low period by setting a reference voltage value or the like.

Figure 10:
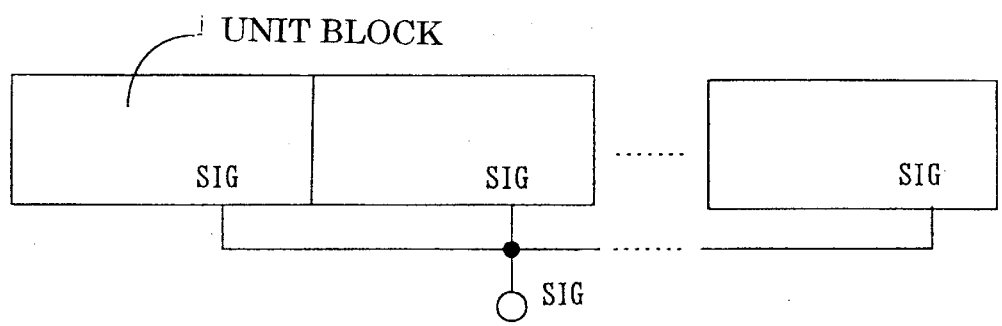
FIG. 10 is a block diagram of the embodiment of the image sensor of the present invention.
Figure 11:
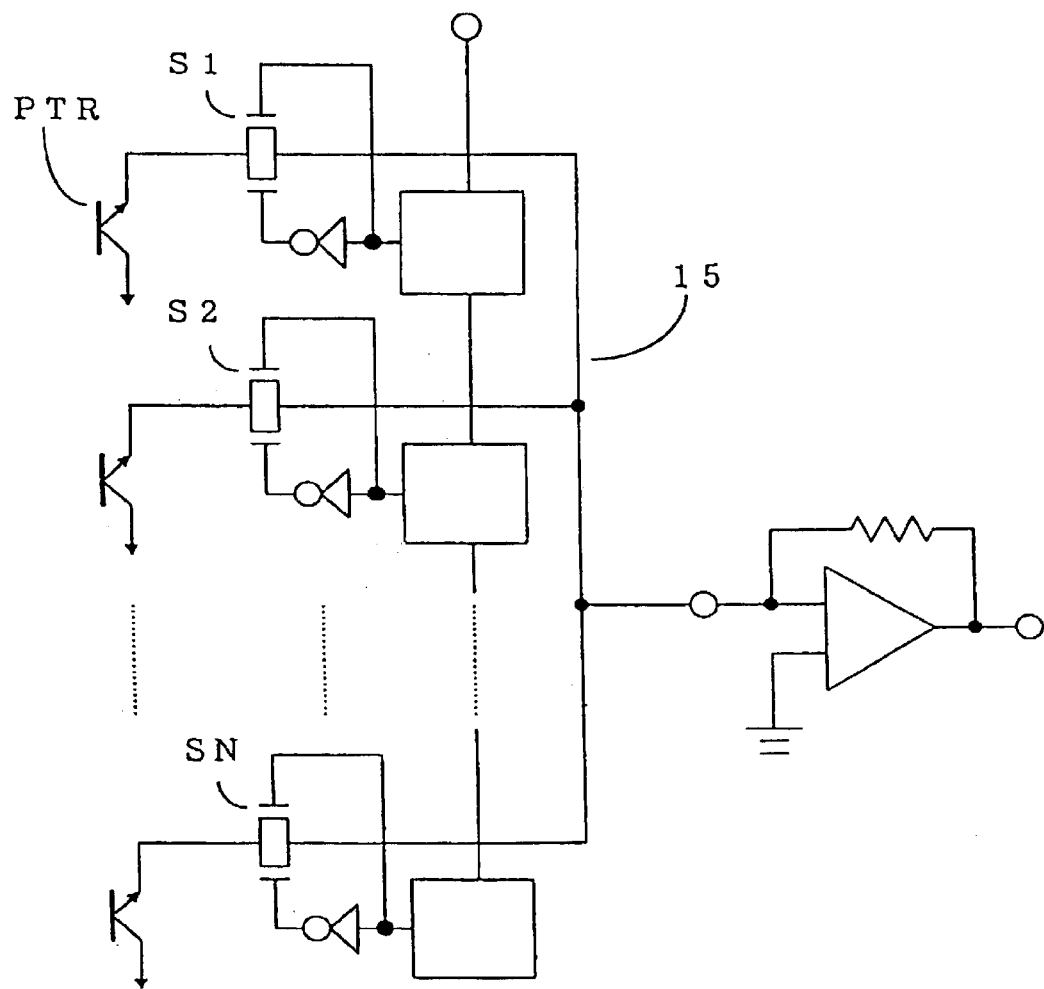
FIG. 11 is a circuit diagram of a conventional image sensor.

FIG. 10 shows a block diagram of the image sensor of the present invention by taking the linear image sensor IC as a unit block. For convenience omission was made for the input and output terminals including the power supply other than the signal output terminal SIG.

As explained above, the present invention supplies an image sensor low in cost and less in after-image. Also, during operation, on-light output voltages and a reference voltage, that is almost the same degree as the off-light output voltage which is the potential upon initialization of the photo-diode, are always outputted to each light receiving element. Accordingly, with simple external circuits an image sensor could be supplied that the effective on-light output can be accurately determined by almost no requirement of external memories or using a small capacity of external memories. Also, high speed operation was possible.

What is claimed is:

1. An image sensor comprising a plurality of linear image sensor ICs arranged linearly, each linear image sensor IC comprising: a plurality of unit light receiving circuits, each unit light receiving circuit comprised of a photodiode for receiving light reflected by an image to be sensed, a first amplifier for amplifying an output signal of the photodiode which varies in response to the received light, a read-out switch for selectively reading out an output of the first amplifier, and a reset switch for resetting the photodiode to an initial potential, wherein a first electrode of the photodiode is held at a fixed potential, a second electrode of the photodiode that varies depending on the received light is connected to an input terminal of the first amplifier, an output terminal of the first amplifier is connected to an input terminal of the read-out switch, an output terminal of the read-out switch is connected to an output terminal of a read-out switch of all of the other unit light receiving circuits through a common signal line, a first electrode of the reset switch is connected to the second electrode of the photodiode, and a second electrode of the reset switch is connected to a reference voltage that serves as the initial potential; and wherein each of the linear image ICs further comprises a scanning circuit for performing a scanning operation by successively scanning the read-out switch and the reset switch of the respective unit light receiving circuits such that output signals from the respective unit light receiving circuits are read out separately by first activating the read-out switch of the respective unit light receiving circuit and during activation of the read-out switch activating and deactivating the reset switch for resetting the photodiode of the respective unit light receiving circuit to the initial potential; a second amplifier for further amplifying a signal read out on the common signal line; and a chip select switch for selectively enabling the second amplifier so that output signals dependent upon a light reception amount are externally read out from the respective unit light receiving circuits in the order of arrangement of the unit light receiving circuits.

2. An image sensor according to claim 1, further comprising a second reset switch having a first electrode connected to the common signal line, a second electrode connected to the reference voltage for applying the initial potential to reset the photodiode to the initial state, and being temporarily opened and closed such that the common signal line rapidly approaches the initial potential when the initial potential upon resetting each unit light receiving circuit is output through the common signal line.

3. An image sensor comprising a plurality of linear image sensor ICs arranged linearly, each linear image sensor IC comprising: a plurality of unit light receiving circuits, each unit light receiving circuit comprised of a photodiode for receiving light reflected by an image to be sensed, a first amplifier for amplifying an output signal of the photodiode which varies in response to the received light, a read-out switch for selectively reading out an output of the first amplifier, and a reset switch for resetting the photodiode to an initial potential, wherein a first electrode of the photodiode is held at a fixed potential, a second electrode of the photodiode that varies depending on the received light is connected to an input terminal of the first amplifier, an output terminal of the first amplifier is connected to an input terminal of the read-out switch, an output terminal of the read-out switch is connected to an output terminal of a read-out switch of all of the other unit light receiving circuits through a common signal line, a first electrode of the reset switch is connected to the second electrode of the photodiode, and a second electrode of the reset switch is connected to a reference voltage that serves as the initial potential; and wherein each of the linear image ICs further comprises a scanning circuit for performing a scanning operation by successively scanning the read-out switch and the reset switch of the respective unit light receiving circuits such that output signals from the respective unit light receiving circuits are read out separately by first activating the readout switch of the respective unit light receiving circuit and during activation of the read-out switch activating and deactivating the reset switch for resetting the photodiode of the respective unit light receiving circuit to the initial potential; a second amplifier for further amplifying a signal read out on the common signal line; and a chip select switch for selectively enabling the second amplifier so that output signals dependent upon a light reception amount are externally read out from the respective unit light receiving circuits in the order of arrangement of the unit light receiving circuits, the chip select switch being enabled during a time period from reading an output signal of a first unit light receiving circuit to a last unit receiving circuit.

4. An image sensor according to claim 3; further comprising a second reset switch having a first electrode connected to the common signal line, a second electrode connected to the reference voltage for applying the initial potential to reset the photodiode to the initial state, and being temporarily opened and closed such that the common signal line rapidly approaches the initial potential when the initial potential upon resetting each unit light receiving circuit is output through the common signal line.

5. A method for successively reading from respective photodiodes of an image sensor IC having a plurality of photoelectric conversion circuits each having a photodiode having a first electrode held at a first potential, a first amplifier having an input terminal connected to a second electrode of the photodiode, a read-out switch having an input terminal connected to an output terminal of the first amplifier and an output terminal connected to an output terminal of a read-out switch of all of the other unit photoelectric conversion circuits through a common signal line, and a reset switch having a first electrode connected to the second electrode of the photodiode and a second electrode connected to a reference voltage that serves as an initial potential, the method comprising the steps of:

performing a first reading operation for reading an image output signal of a photodiode of a first photoelectric conversion circuit and, during the reading operation, resetting an output terminal of the photodiode to the initial potential; and thereafter performing a successive reading operation for reading an image output signal of a photodiode of a successive photoelectric conversion circuit and, during the successive reading operation, resetting the output terminal of the photodiode of the successive photoelectric conversion circuit to the initial potential;

wherein the step of resetting the output terminal of the photodiode to the initial potential is terminated prior to termination of the corresponding reading operation.

6. A method according to claim 5; further comprising the steps of providing a plurality of image sensor IC blocks, each comprising plural ones of the photoelectric conversion circuits; and keeping a chip selection switch of a respective image sensor IC block ON during a time interval when signals are being output from all photoelectric conversion circuits of the image sensor IC block.

7. A method for successively reading from respective photodiodes of an image sensor IC having a plurality of photoelectric conversion circuits each having a photodiode having a first electrode held at a first potential, a first amplifier having an input terminal connected to a second electrode of the photodiode, a read-out switch having an input terminal connected to an output terminal of the first amplifier and an output terminal connected to an output terminal of a read-out switch of all of the other unit photoelectric conversion circuits through a common signal line, and a reset switch having a first electrode connected to the second electrode of the photodiode and a second electrode connected to a reference voltage that serves as an initial potential, the method comprising the steps of:

performing a first reading operation for reading an image output signal of a photodiode of a first photoelectric conversion circuit and, during the reading operation, resetting an output terminal of the photodiode to the initial potential; and thereafter performing a successive reading operation for reading an image output signal of a photodiode of a successive photoelectric conversion circuit and, during the successive reading operation, resetting the output terminal of the photodiode of the successive photoelectric conversion circuit to the initial potential;

wherein the step of resetting the output terminal of the photodiode to the initial potential is terminated after termination of the corresponding reading operation.

8. A method according to claim 7; further comprising the steps of providing a plurality of image sensor IC blocks, each comprising plural ones of the photoelectric conversion circuits; and keeping a chip selection switch of a respective image sensor IC block ON during a time interval when signals are being output from all photoelectric conversion circuits of the image sensor IC block.

* * * * *